June 21, 1927.
F. W. DRISH
GARDEN IMPLEMENT
Filed Sept. 8, 1926
1,633,318
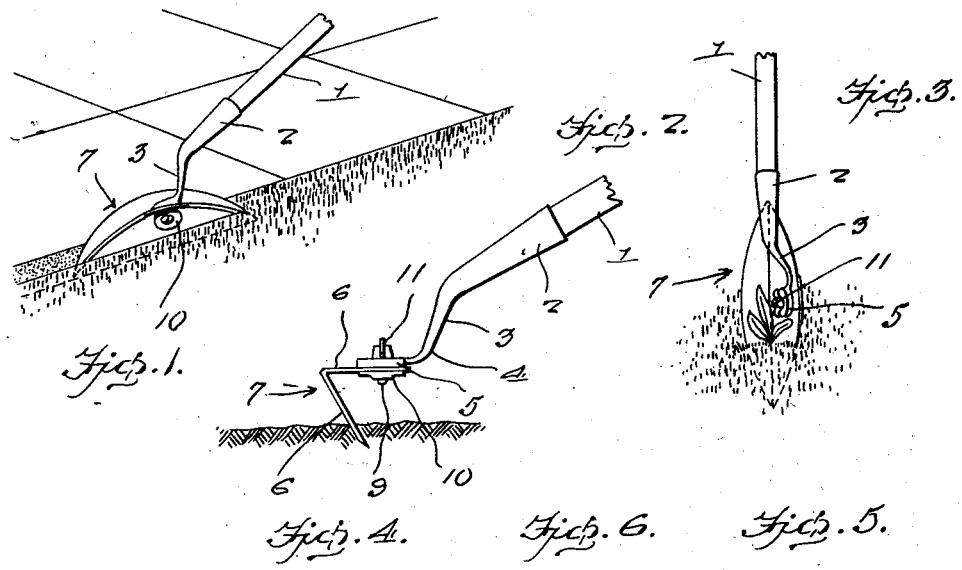
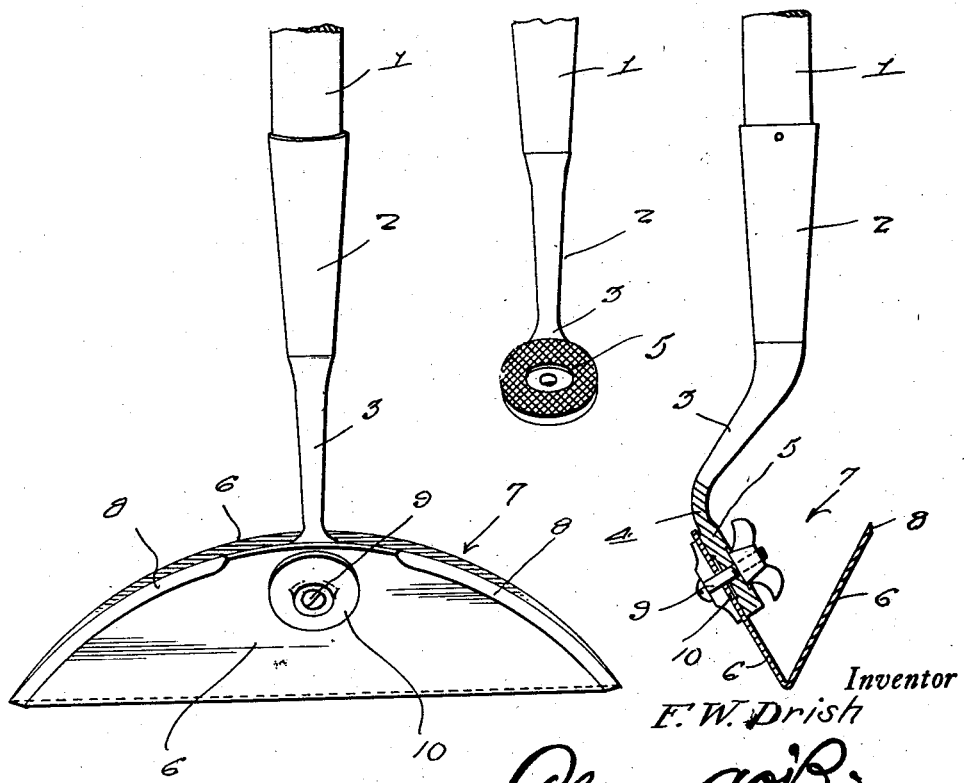
Inventor
F. W. Drish
By Clarence A. O'Brien
Attorney Patented June 21, 1927.

1,633,318

UNITED STATES PATENT OFFICE.

FRANK W. DRISH, OF HOLLYWOOD, CALIFORNIA.

GARDEN IMPLEMENT.

Application filed September 8, 1926. Serial No. 134,210.

This invention relates to an improved hand-manipulated garden implement or tool.

The invention has more specific reference to a device of this kind which includes a handle, a socket having a peculiarly shaped and constructed shank, and an especially designed blade detachably and adjustably connected with said shank.

My principal aim is to provide a tool of this kind which is of such construction as to permit the blade to be converted in such a way as to render the device susceptible for use as an ordinary hoe, as a cultivator, as a lawn-edging tool, and for general digging purposes, for removing weeds, planting seeds, et cetera.

Other objects and advantages of the invention will become apparent in the following description and drawings.

In the drawings forming a part of this application, and in which like numerals designate like parts throughout the same:—

Fig. 1 is a perspective view showing the device used as a lawn-trimmer,

Fig. 2 is a view showing it used as an ordinary cultivating hoe,

Fig. 3 is a view in top plan showing the device used as a weed or plant eradicator, Fig. 4 is an enlarged view showing the entire construction more in detail, Fig. 5 is a detailed view of the connection means for the shank, Fig. 6 is a detailed view showing the head and shank construction.

Referring to the drawings in detail, it will be seen that the reference character 1 designates the handle, 2 a metal socket fitted on the lower end of the handle, and 3 a shank which is formed integral with the socket. It is to be noticed in Fig. 6 that this shank is directed diagonally with respect to the longitudinal axis of the socket and the free end portion 4 terminates in circular attaching head 5. From Fig. 6 it will be seen that this attaching head is provided with a roughened surface so that it will provide anti-slipping contact with one of the side plates 6 of the special blade 7. The blade is in the form of a substantially ovate plate which is bent between its ends to provide a substantially V-shaped blade. From this arrangement it will be seen that the side plates 6 are substantially of semi-ovate or segmental in side elevation. Moreover, a substantial trough or channel is formed between the side portions 6, as the bight portion constitutes a runner or shoe for sliding contact with the ground. Then, too, the curved edge portions of the side plates are provided with cutting edges as at 8. There is a plane portion between the cutting edges and the attaching head 5 is connected with one of the side plates at this point, a bolt 9 being passed through a washer at 10 and through the central opening in the head 5 and a wing nut 11 being carried by the screw-threaded end of the bolt to clamp the parts in the position as shown in Fig. 5. With this arrangement a detachable and adjustable connection is had. Attention is also called to the fact here that while the shank 3 is diagonal with respect to the longitudinal axis of the socket, the head 5 is disposed at a substantial obtuse angle to the shank, thus permitting the blade to take the substantial central position as shown in Fig. 5 with respect to the handle, whereby to insure better leverage and distribution of stresses.

From the foregoing description, it will be seen that I have evolved and provided a simple and inexpensive garden implement capable of considerable variation by converting the blade with respect to the handle to permit it to serve in several different capacities. For instance, the blade may be arranged at right angles to the handle, as shown in Fig. 1 and the device used as a cutting trough to be dragged along the edge of a concrete pavement or walk, whereby to permit convenient and easy trimming of a lawn. This arrangement is represented plainly in Fig. 1. Moreover, as shown in Fig. 2, the blade may be inverted as shown in Fig. 2 to be used as an ordinary cultivating hoe. Then, again, by slight adjustment of the angularity of the blade with respect to the handle, as represented in Fig. 3, it may be used for digging, for instance, for removing weeds, plants, or digging holes. It is therefore evident that the construction is accompanied by several advantages lending practicability and durability to the structure. The construction and features and advantages and various uses will doubtless be plain from the description and drawing. Consequently a more lengthy description is thought unnecessary.

While the preferred embodiment of the invention has been shown and described, it is to be understood that minor changes coming within the field of invention claimed.

I claim:—

1. In a garden implement of the class described, a blade comprising a substantially ovate plate bent upon itself to provide a substantially V-shaped body including diverging plates of semi-ovate design, the curved edges of said plates being provided with cutting edges, and a handle adapted to be adjustably connected with one of said side plates.

2. In a garden implement of the class described, a blade comprising a substantially ovate plate bent upon itself to provide a substantially V-shaped body including diverging plates of semi-ovate design, the curved edges of said plates being provided with cutting edges, and a handle adapted to be adjustably connected with one of said side plates, together with a connection between the handle and blade, said connection including a socket, a diagonally disposed shank, and an angularly disposed attaching head.

In testimony whereof I affix my signature.

FRANK W. DRISH.